Patented Oct. 25, 1932

1,884,166

UNITED STATES PATENT OFFICE

EIKICHI OTSUKA AND EIKICHI SAEGUSA, OF TOKYO, JAPAN

METHOD OF MANUFACTURING POSITIVE ACTIVE MATERIAL FOR THE ALKALINE STORAGE BATTERIES

No Drawing. Application filed December 6, 1929, Serial No. 412,281, and in Japan January 21, 1929.

This invention relates to the manufacture of positive active material for alkaline storage batteries and aims to produce an improved form of active material for positive electrodes composed of nickel and graphite. The main idea is to provide a simple and very economical method of making the material and preparing it for use in the positive plates or electrodes.

Heretofore, the manufacture of positive nickel plates for alkaline batteries has been a rather costly process largely due to excessive waste of the nickel. Nickel hydroxide has been used in granular form after passing it through a 30 mesh sieve. Not more than 5% of it should pass through a 200 mesh sieve. Such granules have been obtained by crushing dried blocks of nickel hydroxide. When the cakes are dried for crushing they shrink, increase in hardness and become brittle. When they are crushed with great care, approximately 30% of the powder will pass through a 200 mesh sieve; whereas, only 5% by volume is usable. This means that 25% of the crushed cakes and the same proportion of the cost of production are wasted.

Experiments have shown that approximately 65% of the failures of such alkaline batteries are caused by excessive expansion of the active material in the positive plates. In nearly all cases of failure, the nickel plates burst by expansion. The expansion may be reduced to some extent by decreasing the pressure used in filling the active material and increasing the porosity; but this increases the contact resistance between the particles and reduces the capacity and strength of the material. Moreover, more than four times the theoretical quantity of nickel hydroxide required per ampere hour has to be used. Hence, the cost of production is necessarily high.

This invention aims to obviate the foregoing difficulties by an improved method of preparing the active material in the form of sticks of uniform length and diameter and utilizing graphite intimately mixed with the nickel and also adhering to the sticks.

In accordance with the improved method, a deposit of nickel hydroxide in the form of mud is first produced conveniently by spraying a saturated solution of nickel sulphate into a heated, 10% solution of sodium hydroxide. This deposit is next washed several times by hot water. Approximately 20% by volume of dry graphite powder, passed through a 100 mesh sieve, is next added and thoroughly mixed with the deposit. The mixed mass or batch is now preferably formed into a plastic block in a filter press which removes a part of the water. The plastic block, formed as described, is next formed into wire preferably by forcing it through an orifice or a small nozzle about 1 mm. in diameter and under a pressure of about 30 kg. per sq. cm. and into a suitable agitating receptacle containing graphite powder. The wire, after it passes through the small orifice is still cohesive, but relatively brittle and breaks automatically into sticks or pieces of about 1-3 mm. in length. These pieces or sticks are covered or coated with the graphite powder in the receptacle. They are then removed from the receptacle, the excess graphite which will not adhere falling off, and they are slowly dried in a suitable oven or container at a temperature not exceeding 100° C. The dried sticks or pieces are of a substantially uniform diameter of 0.5 mm. and are covered or coated with about 4% by volume of graphite. They are next used as the active material in the positive plates of the batteries.

Among the advantages of the method of the present invention is economy in the cost of production. Nickel hydrate in alkaline storage batteries heretofore has been used in a granular state, and of a fineness to pass through a 30 mesh screen but not over 5% should pass through a 200 mesh screen. Such granular material heretofore has been obtained by crushing a block made of the deposited and dried nickel hydrate, which because of the brittleness, results in about 30% of a fineness to pass a 200 mesh screen. If only 5% should be allowable, the remaining 25% must be wasted, or returned for subsequent processes, resulting in an immediate waste of 25% in the total of nickel hydrate produced. According to the present invention, all the nickel hydrate can be used, so that substantial economies are realized.

Experiments show that probably 65% of the damage to alkaline storage batteries is caused by bursting of the positive plates, and almost all of such bursting is considered to be the result of expansion of the active material. This expansion may be reduced to some extent by decreasing the pressure and increasing the porosity of the active material, but this will increase the contact resistance between the particles of such material and will lower the capacity and create difficulties in connection with the supporting means for the active material. A stick of active material made by this invention has a uniform size and length; hence a considerable space is left between the sticks when placed on the supporting plate and the spaces will take care of any expansion of the active material so that the bursting action is minimized.

In practice it has been found that the amount of nickel hydrate required per ampere hour is 4.65 times the quantity theoretically required. The active material of this invention has 20% of graphite in the mixture and 4% of graphite on the surface and this graphite increases considerably the conductivity and activity of the material. Experiments show that 5.9 gr. of nickel hydrate mixed with graphite, according to this invention, were used per ampere hour during a 6 hour discharge, this quantity being about 3.43 times the theoretical quantity; hence the utilizable rate of nickel hydrate is increased to 1.36 times that of the nickel hydrate in batteries heretofore used.

Heretofore 14% of metallic nickel flakes have been mixed with the nickel hydrate to increase conductivity. Nickel flakes are costly and hence the cost of the electrode is considerably increased thereby. With this invention, the cheap graphite and the active material increase conductivity to such an extent that the quantity of nickel flakes used can be decreased to 5% with the resultant economy in the cost of the electrode.

From the foregoing description, it will be noted that there is no waste of the relatively expensive nickel. Further, the graphite, mixed with the active material, greatly cheapens the material and simplifies its manufacture. Moreover, the sticks of material, when placed in the supporting plates, leave interstices or sufficient space between them to permit expansion and resist bursting action. The improved material is very durable and will prolong the life of batteries in which it is used.

While the description explains the preferred mode of manufacturing the improved active material, it will be understood that the method is capable of many modifications and variations.

What is claimed is:

1. That method of making active material for the positive electrodes of storage batteries which is characterized by producing a deposit of nickel hydroxide in the form of mud; washing the deposit with water; adding finely powdered graphite to the deposit and intimately mixing the mass; forming the plastic mass into a cake; extruding the caked mass under pressure to produce a wire to cause it to break into short sticks; applying a coating of powdered graphite to the sticks; and slowly drying the coated sticks.

2. That method of making active material for the positive electrodes of storage batteries which is characterized by producing a deposit of nickel hydroxide in the form of mud; washing the deposit with hot water; adding approximately 20% by volume of finely powdered graphite to the deposit and intimately mixing the mass; forming the plastic mass into a cake; extruding the caked mass under pressure to produce a wire to cause it to break into short sticks; applying a coating of powdered graphite to the sticks; and slowly drying the coated sticks.

3. That method of making active material for the positive electrodes of storage batteries which is characterized by producing a deposit of nickel hydroxide in the form of mud; washing the deposit with water; adding finely powdered graphite to the deposit and intimately mixing the mass; forming the plastic mass into a cake; extruding the cake in the form of a cohesive, brittle wire, breaking the wire into short pieces, and coating with graphite; and subsequently drying the coated pieces at a temperature of approximately 100° C.

4. That method of making active material for the positive electrodes of alkaline storage batteries which is characterized by making a plastic cake of nickel hydroxide mixed with about 20% by volume of powdered graphite; forming the mass into a relatively brittle wire of such size that it will break into short pieces; coating the pieces with about 4% by volume of graphite; and slowly drying the pieces.

5. Active material for battery electrodes comprising short sticks of deposited nickel hydroxide mixed with approximately 20% by volume of graphite; and a coating of graphite baked on the surface of said sticks.

In testimony whereof we affix our signatures.

EIKICHI OTSUKA.
EIKICHI SAEGUSA.